May 9, 1933.　　　　L. L. SMITH　　　　1,908,548
BRUSH CUTTER

Filed March 4, 1930

INVENTOR
Leon L. Smith
BY
ATTORNEY

Patented May 9, 1933

1,908,548

UNITED STATES PATENT OFFICE

LEON L. SMITH, OF WINTERS, CALIFORNIA

BRUSH CUTTER

Application filed March 4, 1930. Serial No. 433,056.

This invention relates to devices for disposing of orchard brush and cuttings or prunings. Such cuttings run anywhere from two to six feet or more in length, and it has been the custom to get rid of the same by burning them, either in a wagon-like burner moved along the orchard or vineyard as the trees or vines are being pruned; or by raking the cuttings up into heaps on the ground prior to burning them. By so doing the fertilizing value of the cuttings is of course lost, except for what relatively small amount of fertilizer may be obtained from the ashes.

The principal object of my invention is to avoid the necessity of burning the cuttings by providing a machine, adapted to be drawn along the ground and to receive the cuttings therein; which machine is provided with means for cutting the matter deposited therein into short enough lengths so that they may be plowed or turned under and used as humus or fertilizer. From the time the cuttings are deposited in the machine until the cut lengths are deposited on the ground, the action is entirely automatic and no attention on the part of an operator is necessary. The necessary healthy condition of the ground is therefore to a great extent restored at practically no expense for labor or fertilizing materials.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
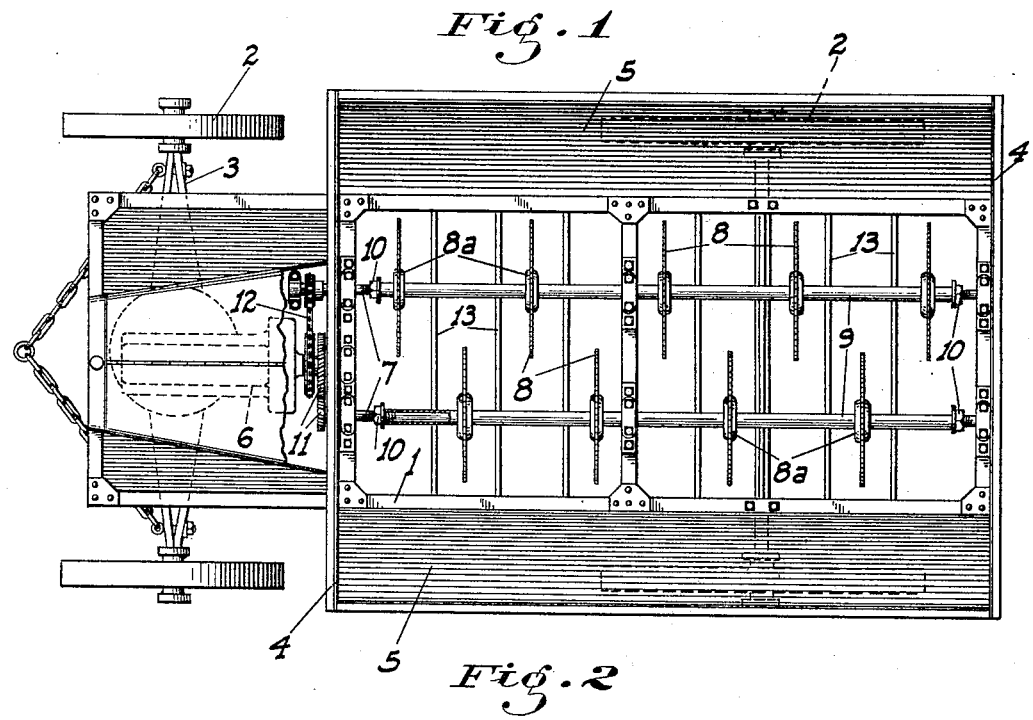
Fig. 1 is a top plan view of my improved brush cutting machine.
Figure 2:
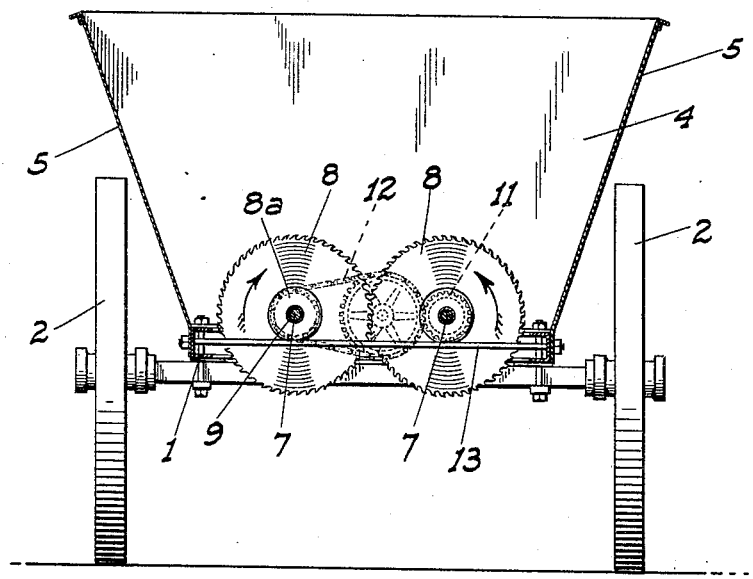
Fig. 2 is a transverse section of the same.

Referring now more particularly to the characters of reference in the drawing, the device comprises a horizontal substantially rectangular frame 1, which is supported a certain distance from the ground by suitable means such as wheels 2. These wheels are preferably arranged as front and rear pairs just as in any ordinary wagon; the forward wheels being mounted on a swivel axle 3 which is adapted for connection to a draft animal.

Mounted on and upstanding from the frame is a large hopper-like body comprising longitudinally spaced vertical end walls 4 and outwardly flaring side walls 5; the front end wall being disposed rearwardly of the front end of the frame so as to leave sufficient room on the frame in front of said wall for mounting a gas engine 6 or similar power plant.

The bottom of the hopper is freely open, so that anything deposited therein will tend to drop to the ground. Extending from end to end of the hopper are transversely spaced shafts 7, suitably journaled on the frame 1 a short distance above the same. Rotary saws 8 of common character are fixed on said shafts at intervals and in alternately staggered relation; the adjacent edges of the saws on the opposed shafts lying in overlapping planes. The saws are held rigid on the shafts by spacers 9 thereon which extend between the usual saw engaging discs 8a. The outermost spacings, beyond all the saws on each shaft, are engaged by nuts 10 mounted on the shaft so that the row of spacers may be firmly clamped against the respective saw engaging discs. One shaft at its forward end and outside the front end-wall of the hopper is connected to the engine shaft by speed increasing gearing 11. The other shaft 7 is connected to the engine shaft by a silent chain drive 12 arranged so as to give said other shaft the same speed as the gear driven shaft, but so that said shafts will rotate in opposite directions. The direction of rotation of the shaft is such that the upper peripheries of the opposed saws will rotate toward each other. Centrally between the adjacent saws on the opposite shafts cross-bars 13 extend across the bottom of the hopper between and are secured to the side members of the frame 1.

By means of the above arrangement it will be seen that while cuttings the full length of the hopper may be deposited in the same, only pieces having a length equal to the space between adjacent saws can fall to the ground, since before the cuttings can thus fall they are subjected to the action of such saws. The lengths into which the cuttings are thus divided are preferably not much over six inches or so, or so that they are of a length which may be readily plowed under the ground without interfering with the proper functioning of the plow, or other implement. The cutting of the full length pieces to these lengths is obtained without any attention on the part of an operator being necessary, by reason of the spacing and staggered arrangement of the rows of saws and their relative over-lapping positions, aided by the cross-bars 13 on which the cuttings temporarily rest while being cut, and which prevent the possibility of relatively long pieces falling to the ground without being properly cut.

Brush or cuttings as gathered and deposited in the hopper are therefore immediately cut and delivered to the ground without further handling, and are then in a condition where they may be turned under where they lay. This is because the device constantly advances as the pruners move from vine to vine or from tree to tree and the cuttings are therefore distributed along the entire ground area traversed during pruning operations.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A brush cutter comprising an open bottomed portable hopper, transversely spaced driven shafts mounted in connection with the hopper along the bottom thereof, circular saws fixed on said shafts in spaced and staggered arrangement, the adjacent edges only of the saws on the two shafts lying in overlapping planes, and cross bars across the bottom of the hopper between adjacent saws on the two shafts.

In testimony whereof I affix my signature.

LEON L. SMITH.